(No Model.)

C. E. HEALY.
TRUNNION BEARING FOR OSCILLATING ENGINES.

No. 511,203. Patented Dec. 19, 1893.

Witnesses
W. J. Rodda
S. J. Baker

Inventor
Caleb E. Healy
by Wm. M. Monroe
Attorney.

UNITED STATES PATENT OFFICE.

CALEB E. HEALY, OF DETROIT, MICHIGAN.

TRUNNION-BEARING FOR OSCILLATING ENGINES.

SPECIFICATION forming part of Letters Patent No. 511,203, dated December 19, 1893.

Application filed August 19, 1893. Serial No. 483,587. (No model.)

*To all whom it may concern:*

Be it known that I, CALEB E. HEALY, a citizen of the United States, and a resident of Detroit, county of Wayne, State of Michigan, have invented certain new and useful Improvements in Trunnion-Bearings for Oscillating Engines, of which I hereby declare the following to be a full, clear, and exact description, such as will enable others skilled in the art to which it appertains to make and use the same.

My invention relates to improvements in trunnion bearings for oscillating engines, and it specially consits in the manner of pivotally mounting the cylinder between the steam chest and outer bearing and in horizontal adjustment therefor, substantially as hereinafter described, shown in the accompanying drawings, and more specifically pointed out in the claims.

Figure 1:
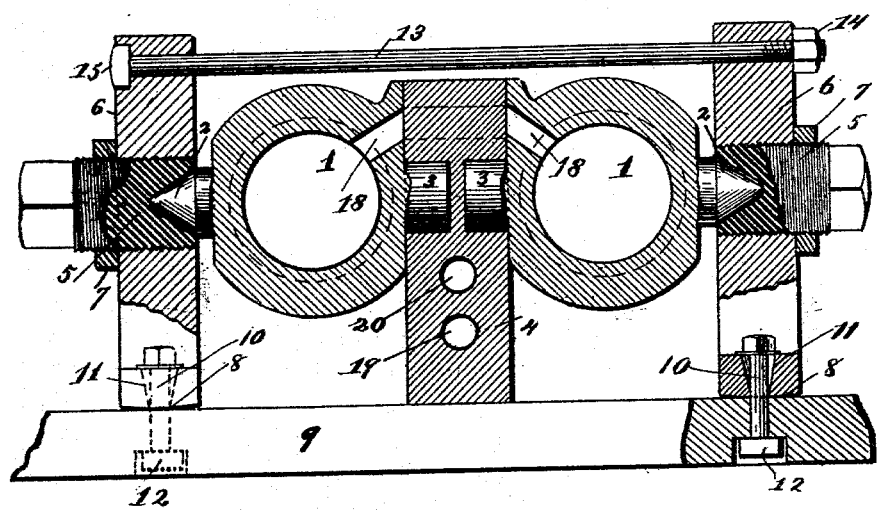
Figure 2:
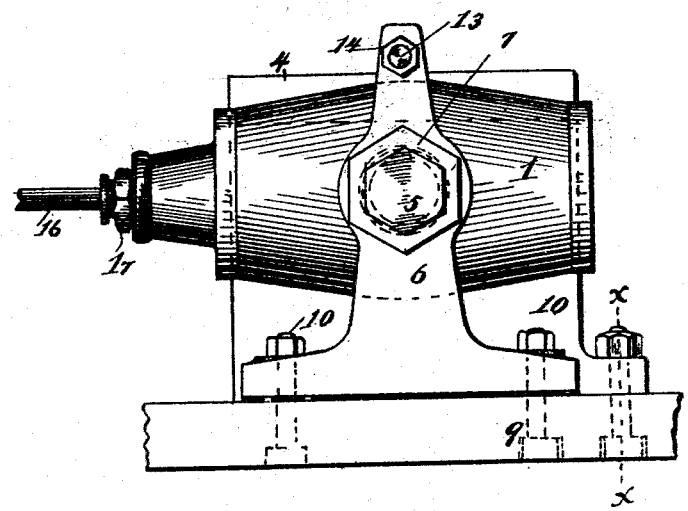

In the accompanying drawings, Figure 1 shows a vertical, transverse section of duplicate engine through trunnion center, also showing oscillating foot in section on line x—x Fig. 2. Fig. 2 is a side view of cylinder and bearings.

In the drawings, 1, 1, are the oscillating cylinders, mounted centrally upon cylindrical trunnion wrists 3, 3, on their inner sides, and upon conically terminating trunnion wrists 2, 2, on their outer sides. The cylindrical wrists are inserted in the sides of the steam chest 4, and the conically pointed ones are inserted in the inner ends of the brass studs 5 which are provided with square or horizontal heads and screw threaded for insertion in the vertical side bearings or standards 6, 6. Clamping nuts 7, 7 are also employed for additional security and are placed outside the side bearings where they are easy of access. It will be seen that, with this arrangement, a quick adjustment of the outer bearings can be made for excessive wear, or for releasing or setting up the cylinders. In order, however, to secure the outer standards 6, 6 more rigidly, and at the same time provide an exceedingly fine adjustment to overcome the least amount of wear without opening any space between the steam chest and oscillating cylinder, the following construction is employed:

The lower surface of the side standards 6, 6, are rounded transversely at 8, 8, where they rest upon the bed plate 9 in the form of an arc of large degree of curvature. The extended feet of these standards are vertically pierced with the taper bolt holes 11, 11, for the retaining bolts 10, which pass through the bed plate 9, and are provided with square heads 12 to prevent turning. The upper extremities of the standards are connected transversely by the through bolt 13, provided with the nut 14, at one extremity and square head 15 at the other extremity, countersunk in a square cavity. By means of this bolt and nut an infinitesimal adjustment of the bearing can be made since the bearing will oscillate upon the curved lower end, without perceptibly varying the center of revolution of the trunnions while any degree of wear will be equalized between the bearings. The construction is, of course, only adapted to very fine adjustment.

It is obvious that, without oscillation of the standards upon their bases, the bolt 13 could not be employed for adjustment, since the parts would spring and cause excessive friction and endanger the separation of the cylinders and steam chest, which would result in the escape of steam from the parts.

It is obvious that the same style of adjustment can be employed with an engine provided with one cylinder, the only change essential being that the bolt 13 can be passed through an extension above the steam chest and the parts will operate as before.

16 represents one of the piston rods (the engines being upon the center), and 17 the stuffing box.

18, 18, are the cylinder ports, and 19, 20 are the openings for pipe attachment for live or exhaust steam.

Having described my invention, what I claim as new, and desire to secure by Letters Patent, is—

1. In an adjustment for the bearings of an oscillating engine, the combination of the vertical steam chest 4 and outer support 6, the cylinder 1, provided with cylindrical trunnion wrists 3, inserted in said steam chest, conically tapered trunnion wrist 2, inserted within the screw threaded stud 5, and lock-nut 7, upon said stud, with the fine adjustment consisting in the standard 6, supporting said stud 5, and adapted to oscillate upon a rounded base, substantially as described.

2. In an adjustment for the trunnion bearings of an oscillating engine, the combination of the wrist 2, threaded pivot stud 5, provided with the clamping nut 7, and oscillating standard 6, substantially as described.

3. In an adjustment for the trunnion bearings of an oscillating engine, the wrist 2, pivot threaded stud 5, and oscillating standard 6, substantially as described.

CALEB E. HEALY.

Witnesses:
WM. M. MONROE,
W. J. RODDA.